United States Patent [19]

Wang et al.

[11] Patent Number: 5,365,451
[45] Date of Patent: Nov. 15, 1994

[54] MOBILE UNIT TRACKING SYSTEM

[75] Inventors: Theresa C. Y. Wang, Scottsdale; Steven H. Moritz, Phoenix, both of Ariz.

[73] Assignee: Motorola, Inc., Schaumburg, Ill.

[21] Appl. No.: 205,753

[22] Filed: Mar. 4, 1994

Related U.S. Application Data

[63] Continuation of Ser. No. 803,835, Dec. 9, 1991, abandoned.

[51] Int. Cl.$^5$ .............................................. H04B 1/00
[52] U.S. Cl. ..................... 364/449; 364/443; 364/466; 342/357; 342/451; 342/457; 342/385
[58] Field of Search .............. 364/443, 450, 449, 452, 364/466, 454; 342/357, 451, 50, 356, 457, 385, 386

[56] References Cited

U.S. PATENT DOCUMENTS

| | | | |
|---|---|---|---|
| 4,819,174 | 4/1989 | Furuno et al. | 364/444 |
| 4,881,080 | 11/1989 | Jablonski | 342/357 |
| 4,903,212 | 2/1990 | Yokouchi et al. | 364/449 |
| 4,907,290 | 3/1990 | Crompton | 445/56 |
| 4,983,980 | 1/1991 | Ando | 342/357 |
| 5,014,206 | 5/1991 | Scribner et al. | 364/449 |
| 5,153,836 | 10/1992 | Fraughton et al. | 364/461 |
| 5,155,490 | 10/1992 | Spradley, Jr. et al. | 342/357 |
| 5,155,689 | 10/1992 | Wortham | 364/460 |
| 5,221,925 | 6/1993 | Cross | 340/988 |

Primary Examiner—Thomas G. Black
Assistant Examiner—Julie D. Day
Attorney, Agent, or Firm—Gregory J. Gorrie; Robert M. Handy

[57] ABSTRACT

A communication network keeps track of the locations of mobile units which utilize the network. On powering up, the mobile units determine their current locations using signals broadcast, for example, by overhead satellites. They then send data communication messages to the network describing their locations. The network saves the locations and returns data messages that describe borders which surround the mobile units' locations. The mobile units repetitively determine their current locations on a regular schedule. When their current locations are outside of their prescribed borders, they send other location data messages to the network to update the location data being maintained by the network and to receive a definition of a new border.

19 Claims, 5 Drawing Sheets

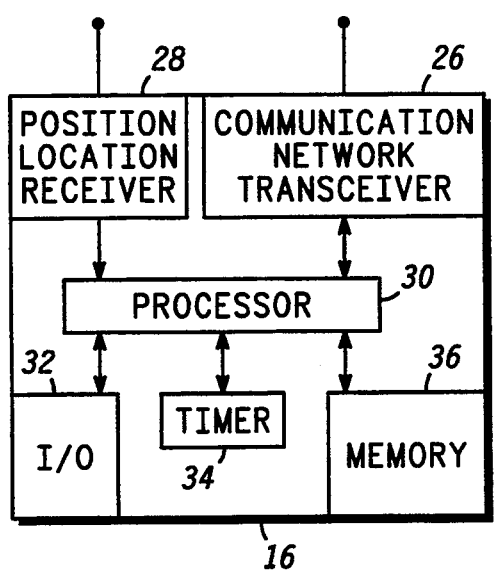
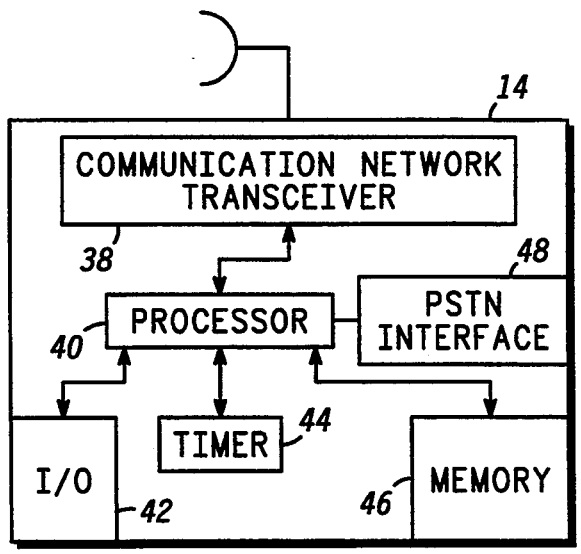
*FIG. 2*
*FIG. 3*
*FIG. 4*
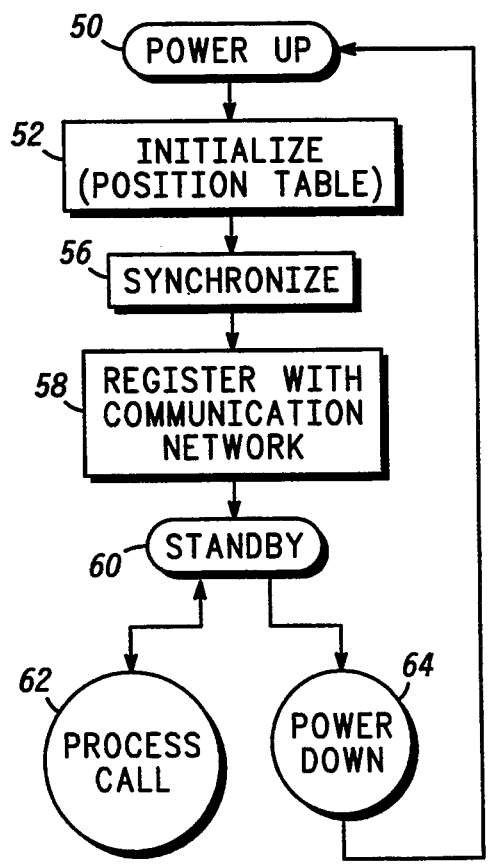
*FIG. 5*
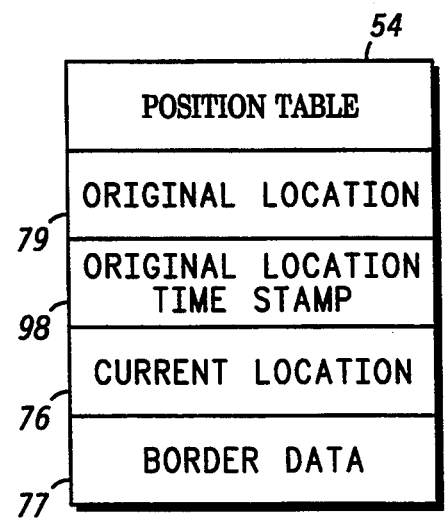

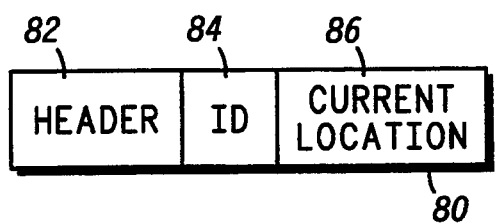
FIG. 7
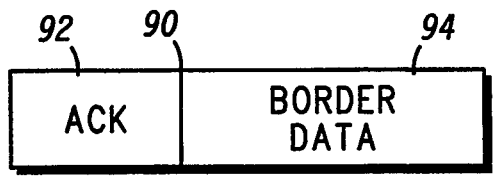
FIG. 8
FIG. 10
FIG. 11

MOBILE UNIT TRACKING SYSTEM

This application is a continuation of prior application Ser. No. 07/803,835 filed Dec. 9, 1991, and now abandoned.

TECHNICAL FIELD OF THE INVENTION

The present invention relates generally to tracking systems. More specifically, the present invention relates to tracking systems which maintain data describing the locations of mobile units.

BACKGROUND OF THE INVENTION

Tracking systems occasionally use radio communications to discover the whereabouts of mobile units. One example of such a tracking system is used by a communication network which provides communication services through mobile radio transceivers. Radio communication messages, which are transparent to radio users, keep a central controller informed of the locations of the mobile transceivers receiving communication services through the network.

Location data are extremely valuable to a communication network. Knowledge of mobile unit location allows the network to most advantageously route communications through nodes of the network. In addition, it allows the network to conform to diverse rules and procedures which may be imposed by diverse political entities within whose jurisdictions the network may operate. For example, one jurisdiction may permit network operations only within a first set of frequencies while an adjacent jurisdiction may permit network operations only within a second set of frequencies. In addition, different tariffs or taxes may apply to communication services utilized by mobile units operating in different jurisdictions.

The more accurate the location data, the better. More accurate data allow the network to better ascertain when mobile units cross from one jurisdiction into another. However, costs generally increase in proportion to the accuracy of the location data, and an intense need to keep costs as low as possible and revenues as high as possible exists. One cost, which is of particular concern, is the amount of communication resources which are consumed in maintaining current location data. As more resources are consumed in maintaining current location data, fewer resources are available for use by communication service subscribers and for generating revenues. In addition, mobile units are often battery operated, and an excessive quantity of communications leads to an excessive use of available battery power.

SUMMARY OF THE INVENTION

Accordingly, it is an advantage of the present invention that an improved tracking system is provided.

Another advantage of the present invention is that a tracking system is provided which minimizes the quantity of communications required to maintain valid data.

Yet another advantage is that the present invention provides a tracking system which is programmable so that it can conform to diverse location-reporting needs imposed by diverse regions within which mobile units may operate.

The above and other advantages of the present invention are carried out in one form by a method of tracking a mobile unit. In a mobile unit, the method calls for receiving a data message describing a border. The mobile unit then determines when the mobile unit is outside of the border. When the mobile unit is outside the border, the mobile unit transmits a current location message describing its then-current location.

The above and other advantages of the present invention are carried out in another form by a method of tracking a mobile unit. The method calls for receiving original location data from the mobile unit. These original location data describe an original location of the mobile unit. These original location data are saved, and a data message is transmitted to the mobile unit. The data message describes a border that surrounds the original location.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows a block diagram of a mobile unit which communicates with the network;

FIG. 3 shows a block diagram of a gateway which serves as a node in the network;

FIG. 4 shows a flow chart of a power up procedure performed by the mobile unit;

FIG. 5 shows a block diagram of a position table memory structure maintained within the mobile unit;

FIG. 7 shows a block diagram of a current location data message transmitted by the mobile unit;

FIG. 8 shows a block diagram of a border data message transmitted by the gateway;

FIG. 10 shows a block diagram of a subscriber database memory structure maintained within the gateway; and FIG. 11 shows a block diagram of a border database memory structure maintained within the gateway.

DETAILED DESCRIPTION OF THE PREFERRED EMBODIMENT

Figure 1:
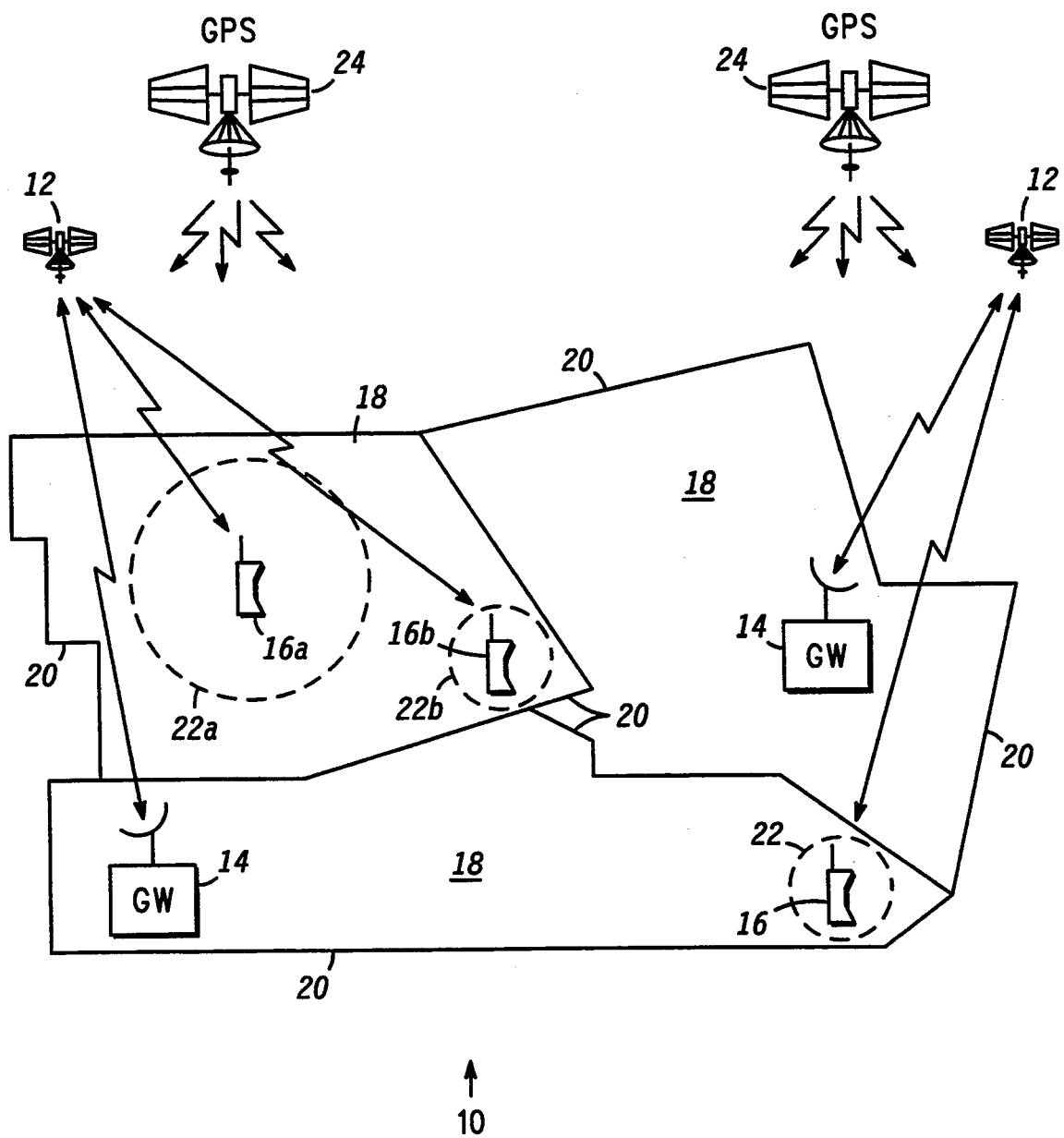
FIG. 1 shows a region of the earth within which a communication network operates.

FIG. 1 shows one of many different regions of the earth where a communication network 10 operates. In the preferred embodiment, network 10 includes artificial satellites 12 which orbit the earth. Satellites 12 may be moving with respect to the earth or stationary (i.e. geosynchronous) or may include some of each. As used herein, the words "orbit" or "orbit the earth" are intended to include all such arrangements. Communications may be routed through satellites 12 and through gateways 14. Gateways 14 are located on the ground at fixed installations. Satellites 12 and gateways 14 serve as nodes for network 10. Gateways 14 couple to the public switched telecommunications network (PSTN) so that communications may be routed through network 10 to or from any terminal coupled to the PSTN.

Network 10 provides communication services to any number of mobile units 16. As the name implies, mobile units 16 are not dedicated to any particular location but may be moved from place to place. Mobile units 16 include hand-held devices which are easily portable as well as devices which are transportable with difficulty. Mobile units 16 establish a data communication link with a nearby satellite 12, which may then relay the data communication to a nearby gateway 14.

Mobile units 16 operate, within any one of a number of different political jurisdictions 18. Jurisdictions 18 are surrounded by political boundaries 20. As a general rule, boundaries 20 possess irregular shapes. Network 10 needs to know with accuracy when mobile unit 16 crosses a boundary 20 so that frequency allocation, billing, tax, and other parameters may be set in accordance with the appropriate jurisdiction 18. Network 10 also needs to know, albeit with less accuracy, where mobile units 16 are so that calls may be best routed through satellites 12.

When a mobile unit 16 is centrally located within a jurisdiction 18, as depicted at mobile unit 16a, it is not near a boundary 20. Consequently, network 10 needs only relatively inaccurate data concerning the location of the mobile unit 16a. Mobile unit 16a may move a relatively large distance before it nears a boundary 20. This large distance is indicated by the radius of a circle around mobile unit 16a. This circle forms a border 22a.

In contrast, when a mobile unit 16 is near a boundary 20, as depicted at mobile unit 16b, network 10 needs relatively accurate data regarding the location of mobile unit 16b. Mobile unit 16b may enter another jurisdiction 18 by moving a relatively small distance, as indicated by the radius of border 22b.

As will be discussed in more detail below, mobile units 16 determine, at least in part, their own locations. In the preferred embodiment of the present invention, mobile units 16 utilize a satellite positioning system 24, such as the Global Positioning System (GPS), in making this determination. System 24 includes a constellation of artificial satellites which orbit the earth. System 24 satellites may be the same or different than satellites 12. In a typical embodiment, the satellites of system 24 are different than satellites 12, but this is not essential. Mobile units 16 utilize conventional techniques to monitor and process signals transmitted by system 24 to determine their own locations. For convenience of explanation and not intended to be limiting to the present invention, the operation of system 24 is described for a GPS position locating system, but those skilled in the art will understand that other position location systems may also be used.

In general terms, the tracking system of the present invention uses mobile units 16 and gateways 14 of network 10. Satellites 12 operate as nodes for relaying data communications between a mobile unit 16 and a gateway 14. Each mobile unit 16 determines its own location and sends a data communication to network 10 at a nearby "local" gateway 14 to let network 10 know its location. When the gateway 14 receives the location communication, it generates data which define a border 22 and sends these border data back to the mobile unit 16. So long as the mobile unit 16 operates within the defined border 22, it does not need to inform network 10 of its whereabouts. However, when the mobile unit 16 goes outside the border 22, it sends a new location communication to network 10 and receives a new border definition in response.

Thus, the tracking system of the present invention minimizes the number of communication messages which are needed for maintaining valid data. Less accurate data are maintained with few location communication messages when less accurate data may be tolerated, as indicated at mobile unit 16a and border 22a. More accurate data are maintained by more location communication messages when more accurate data are required, as indicated at mobile unit 16b and border 22b in FIG. 1.

FIG. 2 shows a block diagram of a mobile unit 16. Mobile unit 16 includes a transceiver 26 which transmits and receives signals in a format compatible with satellites 12 and network 10 (see FIG. 1). These signals include data messages which allow mobile unit 16 to be in data communication with a nearby satellite 12. Through this satellite 12 mobile unit 16 is also in data communication with any other node of network 10, such as a nearby gateway 14 (see FIG. 1). A position location receiver 28 of mobile unit 16, as for example a GPS receiver, receives the signals broadcast by positioning system 24 (see FIG. 1) and generates data describing the current location of mobile unit 16. Transceiver 26 and receiver 28 both couple to a processor 30. Processor 30 additionally couples to an input/output (I/O) section 32, a timer 34, and a memory 36. I/O section 32 is used to collect user inputs, such as the operation of power switches, and the collection of phone numbers for placing a call. Processor 30 uses timer 34 to maintain the current date and time. Memory 36 includes data which serve as instructions to processor 30 and which, when executed by processor 30, cause mobile unit 16 to carry out procedures which are discussed below. In addition, memory 36 includes variables, tables, and databases that are manipulated due to the operation of mobile unit 16.

FIG. 3 shows a block diagram of a gateway 14. Gateway 14 includes a transceiver 38 which transmits and receives signals in a format compatible with satellites 12 (see FIG. 1). These signals include data messages which allow gateway 14 to be in data communication with a nearby satellite 12 and with any number of mobile units 16. Transceiver 38 couples to a processor 40. Processor 40 also couples to an I/O section 42, a timer 44, a memory 46, and a PSTN interface 48. I/O section 42 receives input from keyboards and other input devices and provides data to display terminals, printers, and other output devices. Processor 40 uses timer 44 to maintain the current date and time. Memory 46 includes semiconductor, magnetic, and other storage devices for storing data that serve as instructions to processor 40 and which, when executed by processor 40, cause gateway 14 to carry out procedures which are discussed below. In addition, memory 46 includes variables, tables, and databases that are manipulated due to the operation of gateway 14. Through interface 48, gateway 14 communicates with the PSTN.

FIG. 4 shows a flow chart of a power up procedure 50 performed by mobile units 16 in accordance with the present invention. Procedure 50 is performed whenever a mobile unit 16 is energized. A task 52 performs initialization within mobile unit 16. Those skilled in the art will appreciate that during initialization numerous memory locations may be set to predetermined values. As shown in FIG. 5, a position table 54 is a memory structure which mobile unit 16 maintains in memory 36 (see FIG. 2). Table 54 includes data elements that will be discussed in more detail below. Referring back to FIG. 4, task 52 sets at least one of these data elements to a predetermined value. The predetermined value is chosen so that a positioning procedure, discussed below in connection with FIG. 6, will decide that a location communication message needs to be sent to gateway 14 as soon as it evaluates the initialized data element. Consequently, task 52 causes mobile unit 16 to send a location communication message to gateway 14 in response to energization of mobile unit 16.

After task 52, a task 56 synchronizes transceiver 26 for communication with a nearby satellite 12. After task 56, mobile unit 16 may engage in data communications with network 10. In a task 58, mobile unit 16 registers with network 10. This registration is accomplished by sending identification data to the servicing gateway 14 and complying with any authentication procedures imposed by network 10. The servicing gateway 14 is initially determined by the nearby satellite 12 in a process that is transparent to both the mobile unit 16 and the servicing gateway 14. After registration, mobile unit 16 is ready to send or receive calls. When mobile unit 16 is waiting for either an incoming call or for user input instructing an outgoing call, it operates in a standby mode 60. From standby mode 60 it may enter and return from a process call mode 62 when a call occurs. When mobile unit 16 is powered down, it enters a power down mode 64. Mobile unit 16 exits power down mode 64 to repeat power up procedure 50 when it is energized.

Figure 6:
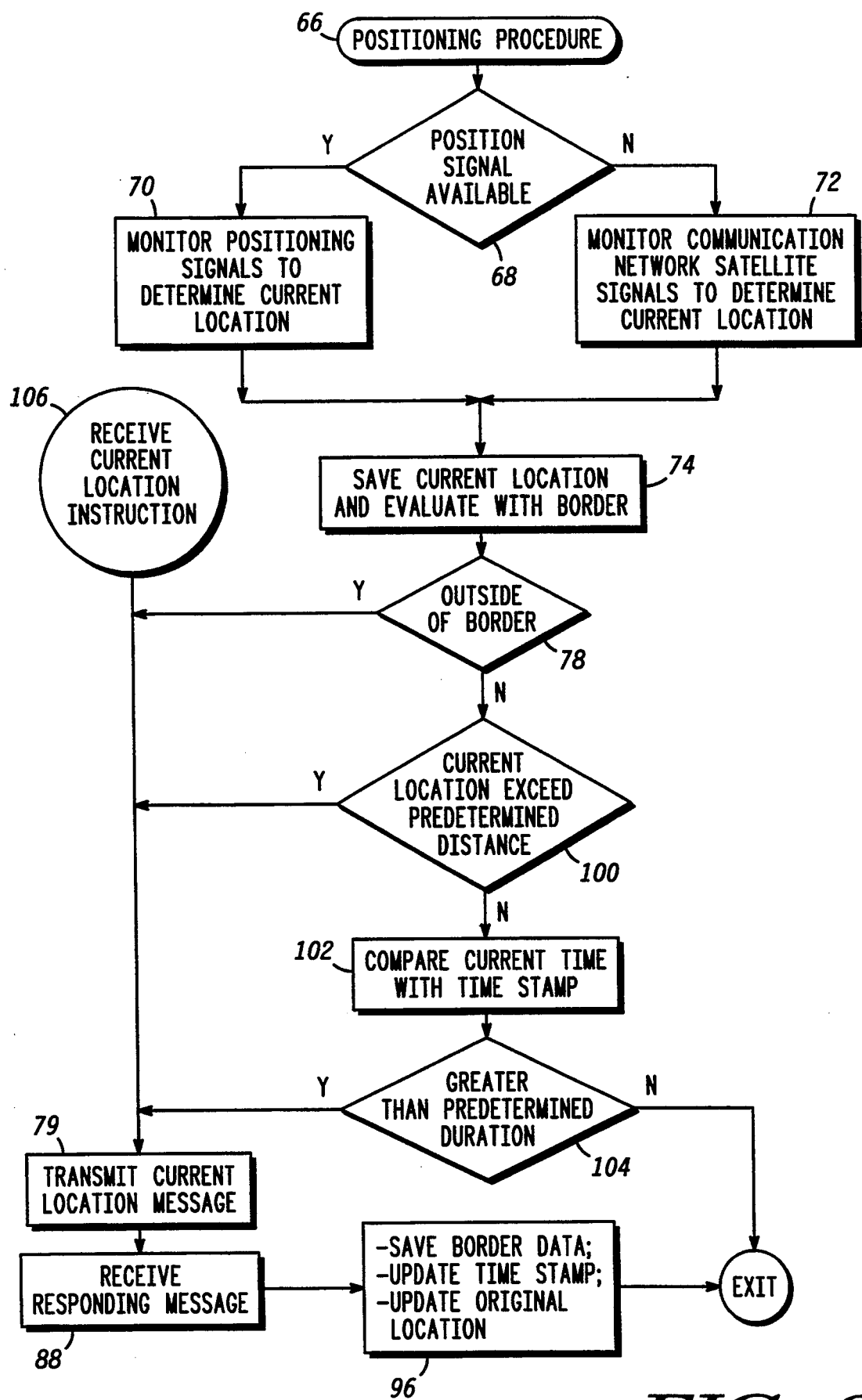
FIG. 6 shows a flow chart of a positioning procedure performed by the mobile unit.

FIG. 6 shows a flow chart of a positioning procedure 66. A mobile unit 16 repetitively performs procedure 66 on a regular schedule while it operates in either standby mode 60 or process call mode 62 (see FIG. 4). In the preferred embodiment, this regular schedule may vary from once every few seconds to once every several minutes or hours.

During procedure 66, mobile unit 16 performs a query task 68 to determine whether a signal from positioning system 24 (see FIG. 1) is available for use in determining its location. In the normal course of operation, system 24 is available and the preferred technique for determining location. Thus, when system 24 is available, mobile unit 16 performs a task 70 utilizing position location receiver 28 (see FIG. 2) to receive signals from system 24. Task 70 processes the signals in a conventional manner to obtain a set of parameters which describe the current location.

On the other hand, to prevent network 10 from being entirely dependent upon system 24, the present invention includes a back-up technique for determining current location. Thus, when system 24 is not available, a task 72 is performed to determine current location from signals broadcast by satellites 12 of network 10. In the preferred embodiments, satellites 12 travel in their orbits with respect to the earth at around 25,000 km/hr. Accordingly, these satellite signals experience a significant amount of Doppler shift, and this Doppler shift changes as the satellite moves overhead. In addition, satellites 12 broadcast cell location data. Consequently, task 72 monitors range and range rate data to obtain a Doppler signature which, when combined with the cell location data, corresponds to the location of mobile unit 16. The back-up technique contemplated in task 72 may be slower and less accurate than the location determination technique of task 70. Nevertheless, such backup location data is preferred over no location data.

After the current location of mobile unit 16 has been determined in either of tasks 70 or 72, a task 74 saves the current location data and evaluates the current location with respect to the current border 22a–22b (see FIG. 1) established for that mobile unit 16. With reference back to FIG. 5, position table 54 includes data elements 76 and 77 which are used for storing current location data and border data, respectively.

When task 70 is used for determining current location, the current location data preferably describe a latitude and a longitude. As used herein, the words "latitude" and "longitude" are intended to include any other reference or measurement technique capable of identifying position. In one embodiment of the present invention, the border data describe minimum and maximum latitudes and longitudes. Thus, border 22 conveniently has a square or rectangular shape. Task 74 compares the current location against border 22 to determine whether the current location is outside border 22.

In another embodiment of the present invention, the border data describe a distance which is interpreted as a radius. A data element 79 of position table 54 (see FIG. 5) describes a latitude and longitude of an original location. Task 74 compares the current location to see if mobile unit 16 is a greater distance from the original location than indicated by this radius. In this embodiment, border 22 forms a circle, as shown in FIG. 1, having a center at the original location and a radius defined by the border data. Task 74 again determines whether mobile unit 16 is outside border 22. Those skilled in the art will appreciate that border data is not limited to describing a square, rectangle, or circle but may describe any shape including the shape of a political jurisdiction 18.

After task 74, a query task 78 routes program control to a task 79 if the current location of mobile unit 16 is outside of border 22. Task 79 transmits a current location data message 80 to network 10. FIG. 7 shows a block diagram of a preferred format for message 80. In particular, message 80 includes a header 82 for informing network 10 that it is a current location message, an ID 84 for informing network 10 about which mobile unit 16 is sending the message, and current location data 86 which describe the current location of the mobile unit 16 in either latitude/longitude or other parameter form.

With reference back to FIG. 6, procedure 66 waits after task 79 until a task 88 receives a responding message 90 from network 10. FIG. 8 shows a block diagram of a preferred format for message 90. In particular, message 90 includes an acknowledgement block 92 which informs mobile unit 16 that network 10 received the previous current location message 80 (see FIG. 7). In addition, message 90 includes border data 94 which describe border 22 (see FIG. 1). Border data 94 should be configured so that the resulting border 22 surrounds the current location specified by current location data 86 of message 80 (see FIG. 7).

After message 90 has been received, a task 96 (see FIG. 6) saves border data 94 (see FIG. 8) in position table 54 at data element 77 (see FIG. 5). In addition, task 96 updates a time stamp data element 98 of position table 54 to indicate the current date and time and updates original location data element 79 of position table 54 (see FIG. 5) to indicate the current location. After task 96, program control exits procedure 66. Procedure 66 is thereafter repeated in accordance with its schedule.

With reference back to task 78, a different process results when the current location of mobile unit 16 is not outside of border 22. In particular, procedure 66 tests for other conditions which can trigger the sending of a current location message to network 10. Generally speaking, these other conditions are backup conditions which occur only rarely in normal operation. Thus, a very small amount of communication resources is consumed in dealing with location reports generated as a result of these conditions.

Specifically, in a preferred implementation a query task 100 determines whether the current location of mobile unit 16 exceeds a predetermined distance from the original location, as indicated by data element 79 (see FIG. 5). Preferably, this predetermined distance is set to such a large value that mobile unit 16 is unlikely to exceed it unless some problem has been encountered in defining border 22. If this predetermined distance has been exceeded, then tasks 79, 88, and 96 are performed to update network 10 and to receive a new definition for border 22.

If this predetermined distance has not been exceeded, then a task 102 compares the time stamp recorded at data element 98 (see FIG. 5) with the current date and time to determine if a predetermined duration has expired. Preferably, this duration is set to a very large value, such as once a month, so that relatively stationary mobile units 16 do not consume a significant amount of communication resources in reporting their locations to network 10. If this predetermined duration has not been exceeded, a task 104 causes program control to exit procedure 66. On the other hand, if this predetermined duration has been exceeded, task 104 routes program control to tasks 79, 88, and 96 to update network 10.

With reference back to task 52 (see FIG. 4), the initialization of position table 54 (see FIG. 5) may set time stamp data element 98 to a predetermined value which indicates a date far in the past. Thus, the first time procedure 66 is performed after energization, task 104 will detect a large duration, a current location message will be sent to network 10, the original location and time stamp will be updated, and new border data will be received from network 10.

While procedure 66 is preferably repeated on a regular schedule, a mobile unit 16 may receive a current location instruction message from network 10 at any time, as indicated at node 106. The current location instruction message instructs mobile unit 16 to respond by sending data describing its location. When this instruction is received, tasks 79, 88, and 96 are performed whether or not procedure 66 is active. As discussed above, in tasks 79, 88, and 96 mobile unit 16 sends the current location message and expects border data in response.

Figure 9:
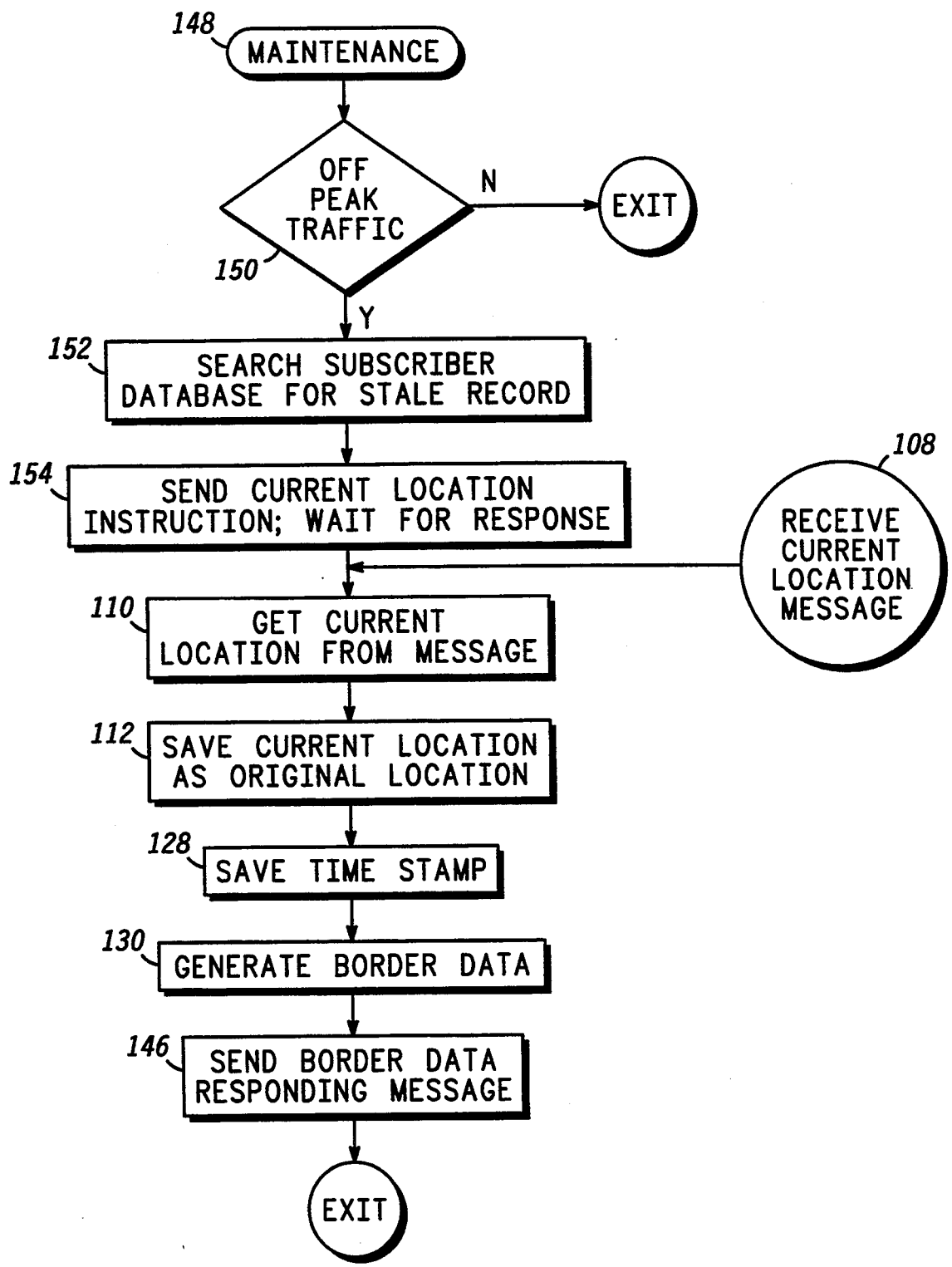
FIG. 9 shows a flow chart of a procedure performed by the gateway.

Gateways 14 desirably perform the tracking function for network 10, but the tracking function may be performed elsewhere in network 10. Each gateway 14 performs this function for those mobile units 16 which are registered there. In the preferred embodiment, each mobile unit 16 has a home gateway 14, but may be roaming within the area served by any other gateway 14. Serving and home gateways 14 may communicate with one another through network 10 or the PSTN as needed to share information about subscriber mobile units 16. FIG. 9 shows a flow chart of a procedure performed by serving gateways 14 in maintaining location data for their registered mobile units 16. From the perspective of a gateway 14, a current location message 80 (see FIG. 7) may be received from any registered mobile unit 16 at any time, as indicated at node 108. When message 80 is received, a task 110 gets current location data 86 (see FIG. 7) from message 80.

A task 112 saves current location data 86 in a subscriber database 114 memory structure maintained within memory 46 (see FIG. 3). FIG. 10 shows a block diagram of database 114. Database 114 includes a record 116 for each registered mobile unit 16. Each record 116 includes a data field 118 for the mobile unit's ID, a data field 120 for the mobile unit's phone number, a data field 122 for the mobile unit's original location, a data field 124 for a time stamp associated with the original location, and other data elements 126. Other data elements 126 describe related home or serving gateways, billing instructions, service level identifiers, and any other data needed for operation of network 10.

With reference to FIGS. 9-10, original location data field 122 describes the last known location of the associated mobile unit 16. It is in data field 122 that the current location data 86 are stored. In other words, the current location is now used as the original location. A task 128 saves the current date and time in time stamp data field 124.

Next, a task 130 uses the current/original location just received from a mobile unit 16 to generate border data. In the preferred embodiment, task 130 uses a border database 132 to generate the border data. FIG. 11 shows a block diagram of a border database 132 memory structure maintained within memory 46 (see FIG. 3). Border database 132 includes records 134 which describe sections of the region served by the gateway 14. Each section is characterized by a minimum latitude 136, a maximum latitude 138, a minimum longitude 140, and a maximum longitude 142. Database 132 includes as many records 134 as are needed to describe the region served by the gateway 14. This region may, but need not, conform to one or more jurisdictions 18 (see FIG. 1). Each record 134 includes border data 144. Border data 144 describe the border 22 (see FIG. 1) to be associated with any mobile unit 16 located within the section defined by associated latitudes and longitudes 136–142. As discussed above, border data 144 may describe a distance which serve as a radius. Alternatively, border data 144 may describe latitudes and longitudes. If fact, latitudes and longitudes 136–142 may serve as border data 144.

With reference to FIGS. 9 and 11, task 130 performs a table look-up operation to find the record 134 in database 132 that is indicated by the location data just received from a mobile unit 16. In the preferred embodiment, task 130 simply reads appropriate border data from data element 144 of database 132. This border data are configured to define a border 22 which surrounds the location indicated by the location data. If the location data, for example, is in the form of Doppler parameters and satellite parameters, task 130 translates such parameters into latitude and longitude data before performing the table look-up on database 132.

After task 130 has obtained border data, a task 146 sends border data responding message 90 (see FIG. 8) back to the mobile unit 16. After task 146, gateway 14 and network 10 have finished processing the current location message received at node 108.

Gateway 14 may additionally perform a maintenance procedure 148 to insure that its original locations are as current as possible. As indicated at task 150, procedure 148 is preferably performed only at off-peak traffic times. In other words, if communication traffic on network 10 through the gateway 14 is nearing its peak capacity, then procedure 148 is deferred until later. That way, communication which results from performing procedure 148 does not usurp communication resources which subscribers may need.

At a task 152, time stamps 124 of records 116 in subscriber database 114 (see FIG. 10) are searched for currently registered subscribers having stale original location data. Task 152 may search for any record 116 for which the time stamp 124 thereof indicates at least a predetermined age with respect to the current time. When a stale record is located, a task 154 sends a current location instruction to the indicated mobile unit 16 and waits for a response from the mobile unit 16. When the response is received, tasks 110, 112, 128, 130, and 146 are performed as discussed above to update original location and time stamp data elements 122 and 124 and to return new border data to the mobile unit 16. After performing task 146, maintenance procedure 148 may be repeated with respect to another stale subscriber record 116.

In summary, the present invention provides a tracking system which minimizes the quantity of communications required to maintain valid location data. Mobile units are dynamically programmed with border data, and the border data are individually adapted to the locations of the mobile units. Thus, the present invention can adapt to diverse location-reporting needs imposed by diverse regions within which the mobile units may operate.

The present invention has been described above with reference to a preferred embodiment. However, those skilled in the art will recognize that changes and modifications may be made in this preferred embodiment without departing from the scope of the present invention. For example, while the preferred embodiment has been described in terms of using a GPS satellite based positioning system for providing location signals to mobile units 16, other positioning systems or methods can also be employed. As used herein, the works "position location" are intended to include such other position location means and methods as will occur to those of skill in the art, whether satellite based or terrestrially based. LORAN is one example of a terrestrially based positioning location system already available in many parts of the world. Other position location means and methods are also known. Accordingly, these and other changes and modifications which are obvious to those skilled in the art are intended to be included within the scope of the present invention.

What is claimed is:

1. A method of tracking a mobile unit, said method comprising the steps of:
   establishing a communication link with a node of a satellite communication system comprised of a plurality of nodes having movement relative to said mobile unit;
   generating at said mobile unit, original location data, said original location data describing an original location of said mobile unit;
   sending said original location data from said mobile unit to said one node;
   first determining by said communication system, a geo-political jurisdiction in which said mobile unit resides based on said original location;
   second determining by said communication system, parameters for said communication link based on restrictions imposed by said geo-political jurisdiction, said parameters including frequency allocation, billing rates and taxes;
   calculating by said communication system, a radius determined in part by said mobile unit's proximity to a border of said geo-political jurisdiction in which said mobile unit resides based on said original location of said mobile unit;
   receiving at said mobile unit, a data message describing said radius;
   defining by said mobile unit, an area around said original location of said mobile unit using said radius;
   third determining, by said mobile unit, when said mobile unit is outside of said area by comparing said original location to a current location of said mobile unit; and
   transmitting to said satellite communication system, from said mobile unit when said mobile unit is outside of said area, a current location data message describing said current location of said mobile unit.

2. A method as claimed in claim 1 wherein:
   said method additionally comprises after said generating step the step of saving in said mobile unit, data describing said original location;
   said data message describing said radius includes a value which describes a distance;
   said defining step comprises the step of defining a circular area using said radius and said original location; and
   said third determining step determines that said current location is outside of said circular area when said current location is greater than said distance away from said original location.

3. A method as claimed in claim 1 wherein said sending step comprises the step of sending said original location data describing a latitude and a longitude of said original location, and said first determining step comprises the steps of looking up in a look up table, said geo-political jurisdiction in which said mobile unit resides based on said latitude and longitude.

4. A method as claimed in claim 1 additionally comprising the steps of:
   fourth determining, at said mobile unit, when said mobile unit has moved to a new location which is at least a predetermined distance away from said original location; and
   transmitting, from said mobile unit, a second data message describing said new location.

5. A method as claimed in claim 1 additionally comprising the steps of:
   saving a time stamp describing the approximate time when said mobile unit was at said original location;
   determining, at said mobile unit, when a predetermined duration has transpired since the time described by said time stamp; and
   transmitting, from said mobile unit upon the expiration of said predetermined duration, a third data message describing said current location.

6. A method as claimed in claim 1 wherein said generating, sending, first determining, second determining, calculating and receiving steps are performed in response to energizing said mobile unit.

7. A method as claimed in claim 1 additionally comprising the step of repeating said first determining, said calculating, said receiving, said defining and said third determining steps after said transmitting step; and the step of
   reevaluating by said communication system, said parameters of said communication link when said said current location resides within a different geo-political jurisdiction.

8. A method as claimed in claim 1 wherein said determining step comprises the steps of:

monitoring radio-frequency signals to obtain a set of parameters which are descriptive of said current location;

evaluating said set of parameters to detect a predetermined relationship with respect to said area; and repeating said monitoring and evaluating steps until said predetermined relationship is detected in said evaluating step.

9. A method as claimed in claim 8 wherein said monitoring step comprises the step of receiving artificial satellite positioning system signals.

10. A method of managing communications between a mobile unit that operates within various geo-political jurisdictions and nodes of a satellite communication network, said method allowing for parameters of a communication link to conform with diverse rules and procedures imposed by said various geo-political jurisdictions, said method comprising the steps of:

generating, at said mobile unit, original location data by using an artificial satellite positioning system, said original location data describing an original location of said mobile unit;

sending, from said mobile unit to a satellite, a data message describing said original location, said satellite being a node of said communication network; and communicating by said mobile unit with said communication network over said communication link, said parameters for said communication link based on restrictions imposed by a geo-political jurisdiction in which said mobile unit resides, said parameters including frequency allocation, billing rates and taxes.

11. A method as claimed in claim 10 wherein said generating, and sending steps are performed in response to energizing said mobile unit, said method further comprises the steps of:

receiving, at said mobile unit, a data message describing a distance defining an area around said original location, said distance determined in part by said mobile unit's proximity to a border of said geo-political jurisdiction in which said mobile unit resides; and sending from said mobile unit to said communication network, new location data when said mobile unit is outside said area.

12. A mobile unit for use in a communication system which manages data describing a location for said mobile unit, said mobile unit comprising:

a location generator for generating original location data describing an original location of said mobile unit when said mobile unit initiates a communication service;

a memory for storing said original location data;

a transceiver for sending said original location data to said communication system; and a processor coupled to said location generator, said memory, and said transceiver, said processor being configured to obtain said original location data from said location generator, cause said memory to save said original location data, cause said transceiver to transmit said original location data to said communication system and to obtain border data received at said transceiver from said communication system, said border data determined by said communication system and including a distance to a boundary of a geo-political jurisdiction in which said mobile unit resides;

said processor causing said location generator to generate current location data and determine when a current location of said mobile unit is outside of a circular area determined by said distance and said original location;

said processor causing said transceiver to transmit a current location data message which includes said current location to said communication system when said current location is outside said area, said communication system determining parameters for said communication service including frequency allocation, billing rate and tax.

13. A mobile unit as claimed in claim 12 further comprising a control unit linked to said mobile unit and wherein said processor is further configured to automatically cause said transceiver to transmit current location data to said control unit when said current location is outside of said area, said current location data describing said current location.

14. A mobile unit as claimed in claim 12 further comprising a control unit linked to said mobile unit and wherein said processor is further configured to determine when a current location of said mobile unit is at least a predetermined distance away from an original location described by said original location data and to transmit current location data to said control unit when said current location is at least said predetermined distance away, said current location data describing said current location.

15. A mobile unit as claimed in claim 12 wherein said processor is further configured to obtain said original location data from said location generator, cause said memory to save said original location data, and cause said transceiver to transmit said original location data in response to said mobile unit being energized.

16. A method as claimed in claim 1 wherein said generating step comprises the step of generating said original location data by monitoring a Doppler signature of at least one satellite of said plurality of orbiting satellites.

17. A method as claimed in claim 1 wherein said generating step comprises the step of generating said original location data by receiving artificial satellite positioning system signals from a Global Positioning System (GPS).

18. A mobile unit as claimed in claim 12 wherein said processor is further configured to establish a communication link with a satellite of said communication system, said satellite being part of a plurality of orbiting satellites having movement relative to said mobile unit and part of said satellite positioning system.

19. A mobile unit as claimed in claim 18 wherein said artificial satellite positioning signals comprise a Doppler signature of said satellite.

* * * * *